United States Patent
Ragsdale

Patent Number: 5,513,894
Date of Patent: May 7, 1996

[54] RIGID AIR-DEFLECTING TANK CONTOURED TO TOW-VEHICLE ROOF

[76] Inventor: Grady S. Ragsdale, South Road 4 Box 264, Dove Creek, Colo. 81324

[21] Appl. No.: 377,336

[22] Filed: Jan. 24, 1995

[51] Int. Cl.$^6$ ............................................... B62D 35/00
[52] U.S. Cl. ............................................... 296/180.2
[58] Field of Search ............................ 296/180.2, 180.4, 296/180.1

[56] References Cited

U.S. PATENT DOCUMENTS

| | | |
|---|---|---|
| 2,481,135 | 9/1949 | Maness, Jr. et al. . |
| 2,714,480 | 8/1955 | Harris . |
| 2,914,231 | 11/1959 | Hornke . |
| 2,975,797 | 3/1961 | Matheney . |
| 3,006,519 | 10/1961 | Doane . |
| 3,095,206 | 6/1963 | Fresia et al. . |
| 3,265,262 | 8/1966 | Motsinger . |
| 3,309,131 | 3/1967 | Saunders ............... 296/180.2 |
| 3,596,974 | 8/1971 | Adams . |
| 3,696,979 | 10/1972 | Erickson . |
| 3,904,236 | 9/1975 | Johnson et al. ........ 296/180.2 |
| 4,045,074 | 8/1977 | Howard . |
| 4,087,124 | 5/1978 | Wiley, Jr. . |
| 4,141,580 | 2/1979 | Ivan ....................... 296/180.2 |
| 4,153,288 | 5/1979 | Mueller . |
| 4,208,197 | 6/1980 | Yakimowich et al. . |
| 4,245,862 | 1/1981 | Buckley, Jr. . |
| 4,264,099 | 4/1981 | Pierce . |
| 4,308,983 | 1/1982 | Yoshida . |
| 4,401,338 | 8/1983 | Caldwell . |
| 4,883,307 | 11/1989 | Hacker et al. ......... 296/180.2 |
| 4,890,879 | 1/1990 | Hurlock . |

FOREIGN PATENT DOCUMENTS

| | | |
|---|---|---|
| 766722 | 7/1934 | France . |
| 2447846 | 8/1980 | France . |
| 2451852 | 10/1980 | France . |
| 2487957 | 2/1982 | France ................... 296/180.2 |
| 2581943 | 11/1986 | France . |
| 2755476 | 6/1978 | Germany ............... 296/180.2 |
| 3045648 | 7/1982 | Germany . |
| 0150823 | 7/1986 | Japan . |
| 998204 | 2/1983 | U.S.S.R. . |
| 2098152 | 11/1982 | United Kingdom . |
| 2136362 | 9/1984 | United Kingdom . |

Primary Examiner—Joseph D. Pape
Attorney, Agent, or Firm—Kenton L. Freudenberg; Maxwell C. Frendenberg

[57] ABSTRACT

A rigid liquid storage tank for mounting atop the rear portion of the roof of a tow vehicle and having a configuration whereby during forward vehicle movement relative air currents are deflected by the forwardly facing surfaces of the tank so as to pass upwardly and outwardly around a trailer towed by the tow vehicle to reduce drag forces on the trailer. The length of the tank is more than twice the width or height of the tank and extends across the rear roof portion transversely of the length of the tow vehicle. The tank has an anchoring connection at each of its ends to secure it to the tow vehicle roof at opposite sides of the roof. The cross-section of the tank is trapezoidal throughout its length between its end walls. The tank walls and interior baffles which dampen liquid motion during operation of the tow vehicle are made of plastic which is sufficiently stiff to make the tank walls sustain the shape of the tank during operation of the tow vehicle without need for additional supporting structure.

20 Claims, 5 Drawing Sheets

RIGID AIR-DEFLECTING TANK CONTOURED TO TOW-VEHICLE ROOF

This invention relates to a removable rigid shape-sustaining air-deflecting tank mounted atop a tow vehicle roof and having a base wall defining the tank's maximum horizontal peripheral dimensions which enclose a base area conforming to the contours of and resting directly on the vehicle roof. The tank's air-deflecting configuration reduces drag at the upper frontal area of a towed trailer vehicle of greater height than the tow vehicle due to relative winds created at the frontal area during forward movement of the vehicles.

BACKGROUND OF THE INVENTION

It has been recognized that forwardly facing walls of trailer vehicles which extend above the roof of the towing vehicle are susceptible of creating substantial drag forces which can impede the forward progress of the vehicles. Such drag forces can be reduced by anchoring an air-deflecting shield on the roof of the tow vehicle to cause relative air currents to be deflected laterally and upwardly so as not to impinge as directly on the towed vehicle as they would in the absence of such a deflector. The deflection of air currents by such shields not only reduces the consumption of fuel during towing, but also can improve stability of the towed vehicle as well as reduce wind created noise around the towed vehicle.

Typically house trailers drawn by automobiles or pick-up trucks extend several feet higher than the roof of the tow vehicle. This is particularly true of the fifth wheel type of trailers towed by pickup trucks because of the increased load towing abilities for such a configuration.

House trailers are usually provided with kitchen and lavatory facilities which require a substantial quantity of stored fresh water during periods of self-contained operation. Waste water during such operation drains to holding tanks in the trailer. Although the size of holding tanks is correlated to the size of fresh water tanks, it is often desirable to have extra capacity for fresh water, especially when water can be used without the necessity of having to temporarily dispose of waste water in holding tanks for subsequent disposal in a sewer or special dump site.

SUMMARY OF THE INVENTION

The present invention presents a dual-purpose tank structure which not only achieves improved performance while towing a trailer, but also provides an extra supply of fresh potable water beyond the capacity of the fresh water tanks provided by the trailer manufacturer.

Among the objects of the present invention are to provide a low cost tank which can be easily mounted and anchored atop the roof of a tow vehicle to achieve reduced drag during trailer towing while also providing a sturdy supporting container for a quantity of water having substantial weight.

Another object of the invention is to provide improved mounting for a liquid tank atop the roof of a tow vehicle.

Another object of the invention is to provide availability of an increased supply of potable water during highway trailering with the weight of the increased supply of water being directly carried by a rigid roof-conforming tank to evenly distribute this weight over a large area of the tow vehicle roof.

A further object of the invention is to provide an air-deflecting roof-top tank for a tow vehicle in which the tank walls provide the essential shape-sustaining tank structure as well as providing the structure to be directly supported by the tow vehicle roof.

Another object of the present invention is to provide an air-deflecting tank structure which can be readily molded of a material which is easily kept sanitary for storing potable water.

DESCRIPTION OF THE PREFERRED EMBODIMENT

Figure 1:
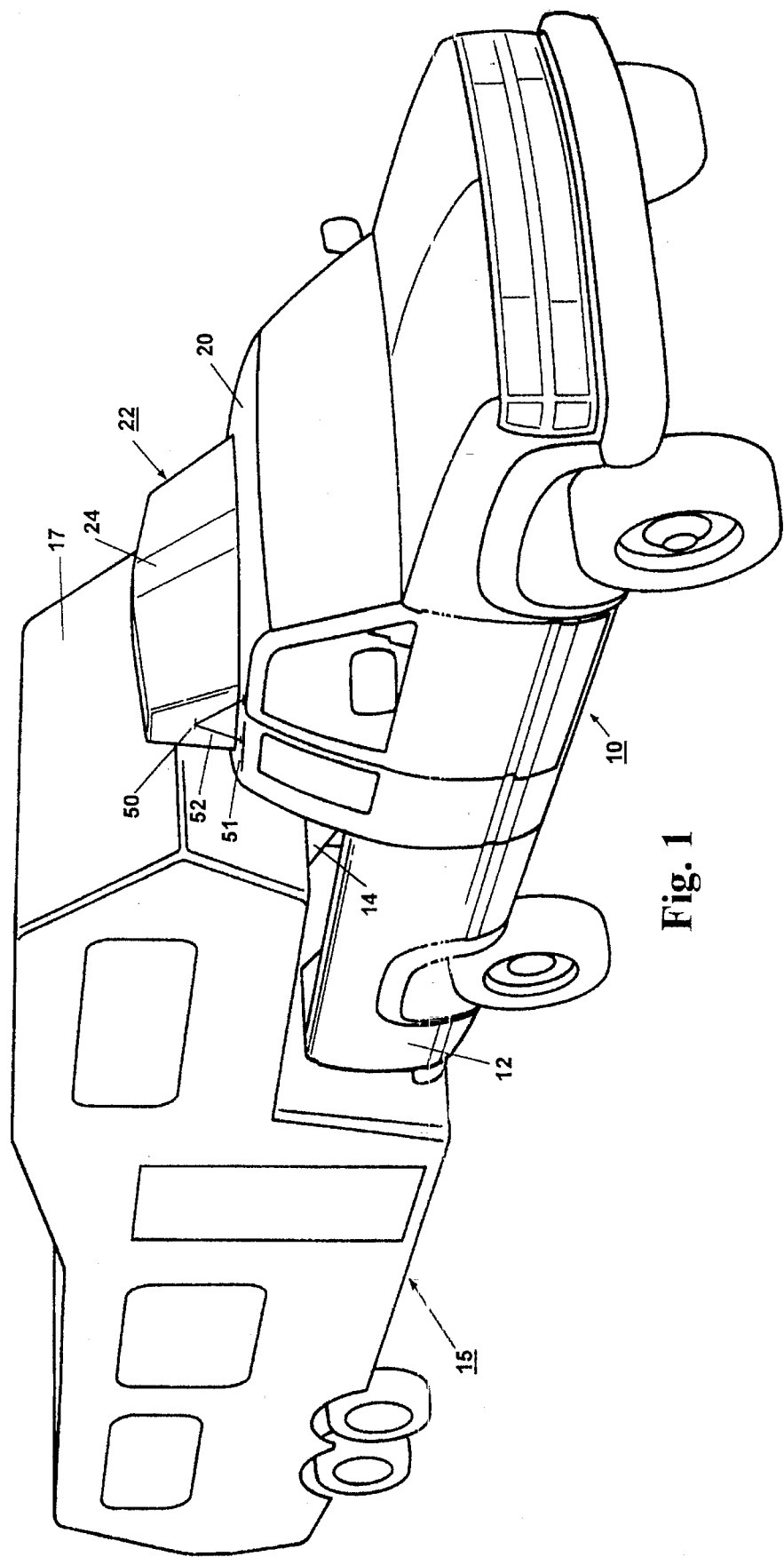
FIG. 1 is a perspective view of a pick-up truck towing a fifth-wheel house trailer with a rigid air-deflecting tank contoured to the truck roof and anchored atop the truck roof by anchoring devices on opposite ends of the tank at opposite sides of the roof.
Figure 2:
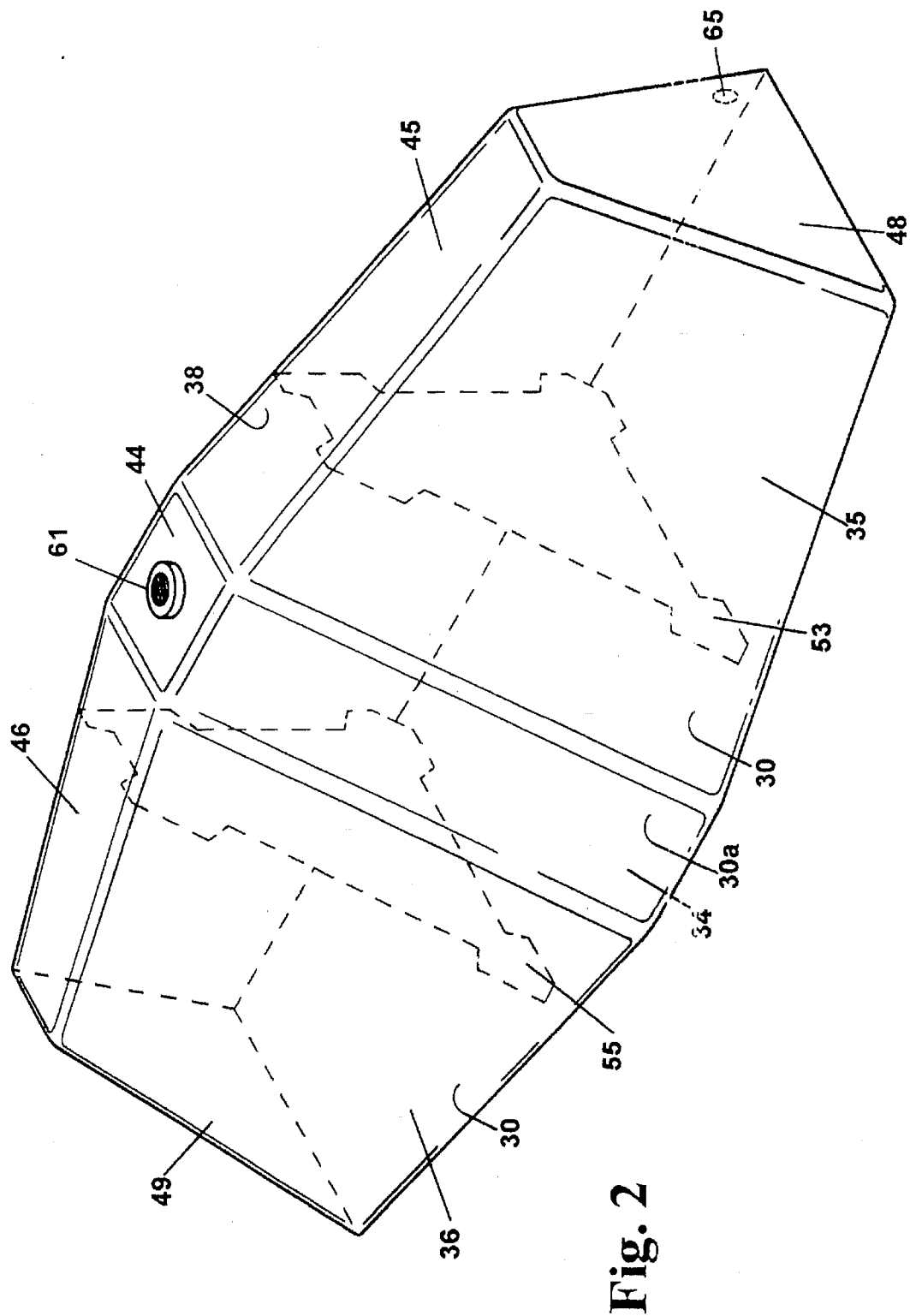
FIG. 2 is a left frontal perspective view of an air-deflecting liquid storing tank showing two internal liquid damping baffles in dotted lines.

As seen in FIG. 1, a tow vehicle 10 in the form of a pick-up truck having an extended cab enclosing a passenger compartment has a bed 12 within which is mounted a suitable conventional towing connection to pivotably receive the gooseneck tongue extension 14 of a fifth-wheel type house trailer 15 being towed by the truck 10. The upper frontal area 17 of the trailer extends higher and wider than the horizontally extending roof 20 of the truck. A rigid liquid storage tank 22 for storing an auxiliary supply of water for use within the house trailer is removably mounted atop the truck roof 20 and has a flat or convex upwardly and/or rearwardly inclined frontal area 24 for deflecting air currents passing over the truck roof during its forward movement in a trailer towing operation so that these air currents or winds are deflected upwardly and laterally outwardly relative to the tank frontal area 24 and the upper trailer frontal area 17 to reduce the drag forces on the trailer caused by the impingement of air currents thereon during towing. The front wall of the tank at any horizontal cross-section of the tank between the bottom and the top of the tank is forwardly flat or convex, i.e., the front wall at this cross-section presents a continuous horizontal surface such that a horizontal line connecting any two points on this surface lies on or rearwardly of the cross-sectional surface extending between the two points. In the illustrated embodiment, the tank has a frontal area formed by a plurality of flat segments including a central section 34 and two side sections 35 and 36 which are angled rearwardly on opposite sides of the central section.

Figure 3:
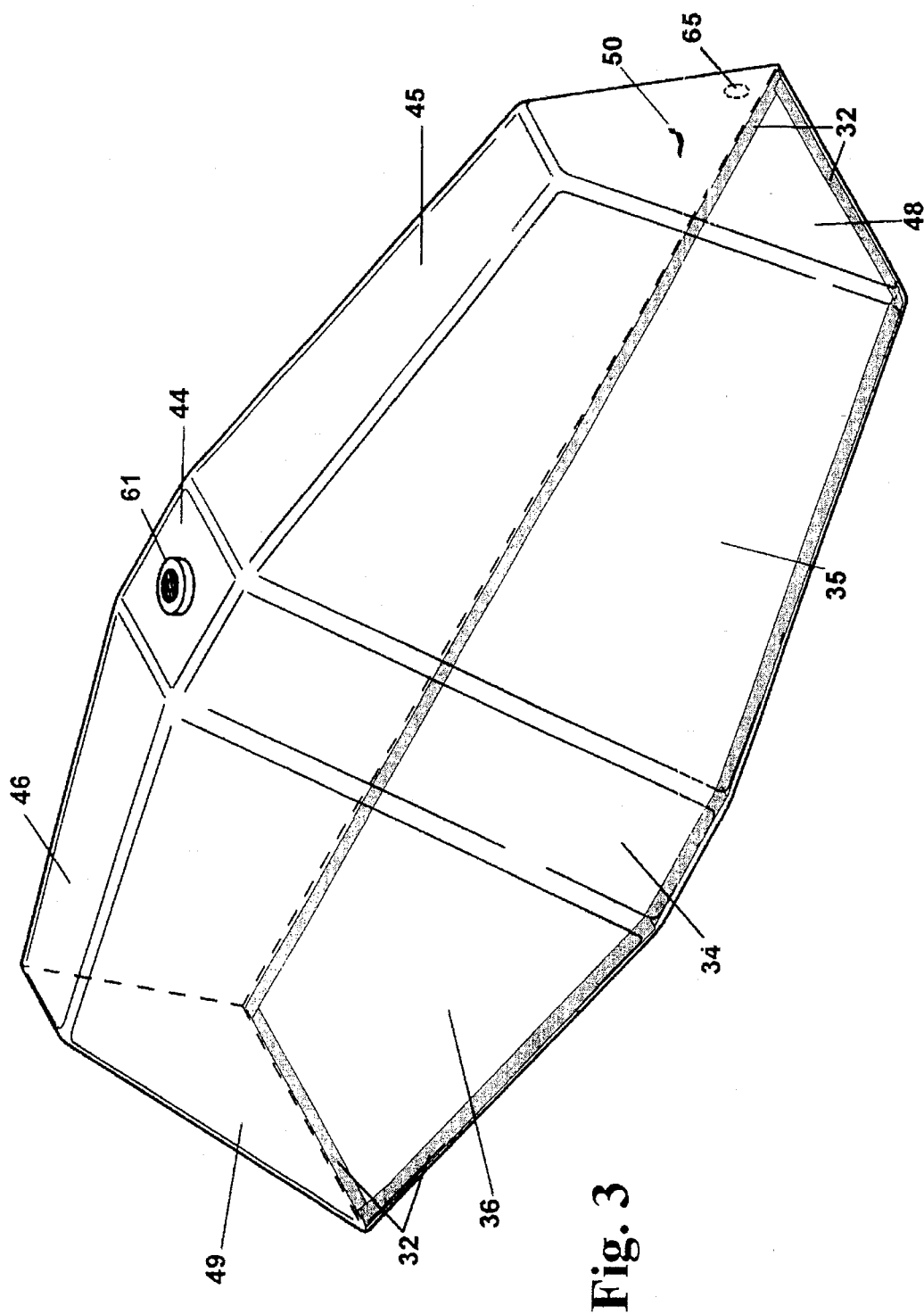
FIG. 3 is a view similar to FIG. 2 but illustrating the location of hook-loop fasteners used to keep the tank from sliding horizontally on the tow vehicle roof.
Figure 4:
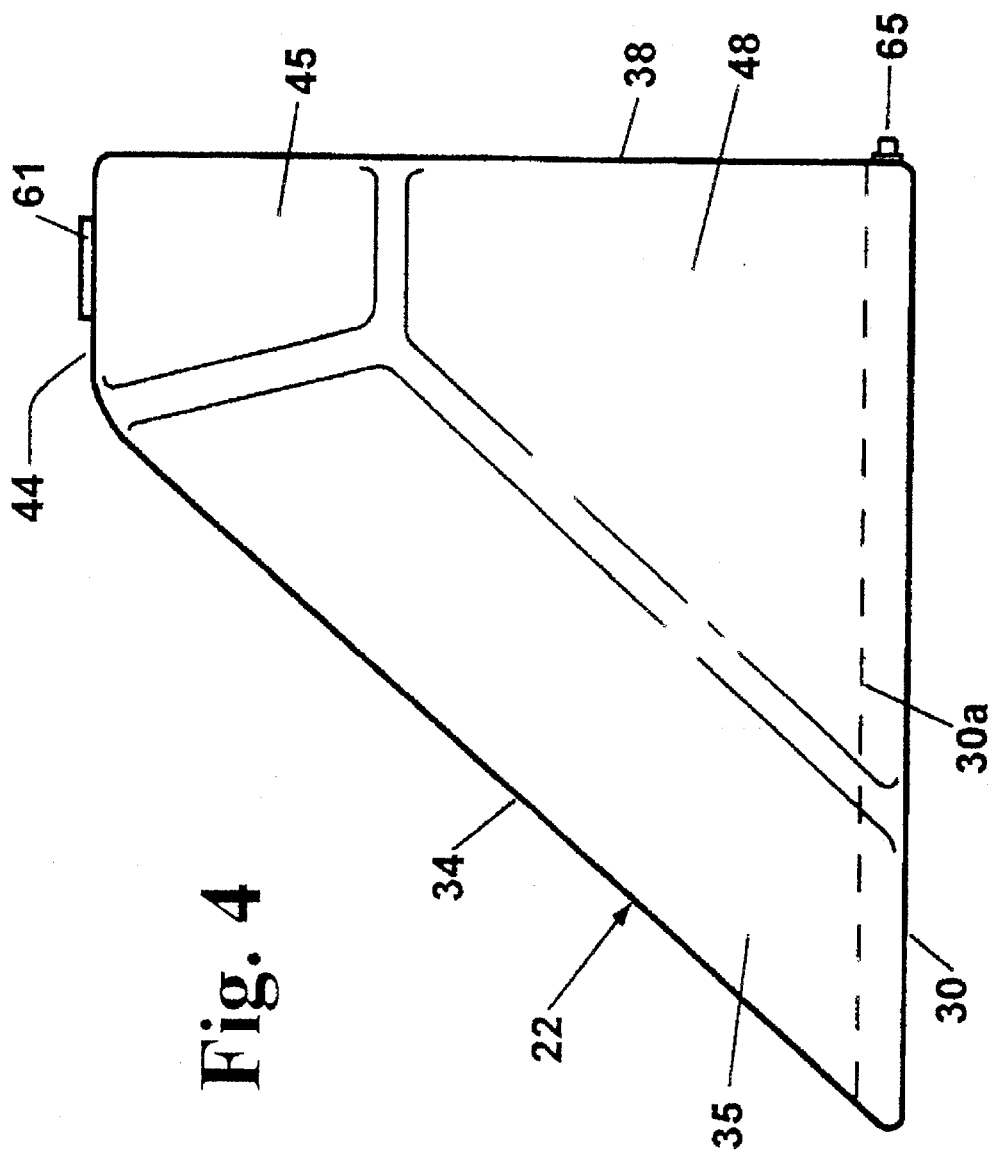
FIG. 4 is a left end view of the tank of FIG. 2.

The tank 22 has a bottom wall 30 configured or contoured with a slightly concave surface having its highest point raised about 1⅛ inches near the center of the bottom wall at 30a to fit the shape or contours of the portion of the roof on which it directly rests on at least a plurality of spaced points along each side of the periphery of the bottom wall and over the central bottom areas in the vicinity of 30a of the bottom wall 30. The tank is partially restrained against horizontal movement relative to the truck roof 20 by means of well-known hook and loop fastener strips 32 shown at the shaded periphery of the bottom wall in FIG. 3 as extending beneath and around the entire periphery of the bottom wall 30. The hook-loop fasteners are sufficiently thin so that although they lie between the bottom wall 30 and the roof, the bottom wall area of the tank within the ring formed by the strips of fasteners may deflect sufficiently or be formed slightly offset downwardly to rest on the roof whereby the heavy weight of the water in the tank 22 will be distributed more evenly over the entire area of the roof which is covered by the tank. The backing of the respective mating strip portions of such hook-loop fasteners are adhesively secured by self-sticking adhesive to opposed surface points of the roof 20 and the tank bottom 30. In cases where the roof 20 has ribbed or other irregularities to strengthen the outer sheet metal panel of the roof 20, thin shims may be adhered to the surface of the roof panel or to the bottom surface of the bottom wall 30 to help distribute the weight of the tank and its contents over the surface of the roof 20. The base of the illustrated tank is about 50 inches long and about 17.5 inches from front to rear and the tank is about 17 inches high, holding about 30 gallons of water weighing 240 pounds, so it is important to have the tank well supported and anchored to the roof during all starting, stopping and turning operations as well as during imposition of vertical road shocks on the tow vehicle 10.

The tank frontal area 24 has three generally flat upwardly and rearwardly inclined front wall sections. A rectangular central front wall section 34 has a base edge perpendicular to the direction of vehicle travel. This section 34 is inclined upwardly and rearwardly, forming an angle of about 53 degrees with the surface of the roof 20. The outer left front wall section 35 and right front wall section 36 are similarly upwardly and rearwardly inclined to the vehicle roof surface but are each slightly obliquely canted to provide surfaces which deflect air both outwardly and upwardly during forward movement of the tow vehicle 10. The terms left and right as used herein to designate tank wall sections refer to sections as viewed from the rear of the tank looking in the forward direction of vehicle travel. A rear vertical wall 38 of the tank is flat and extends perpendicular to the longitudinal direction in which the vehicle travels.

The frontal area wall sections 34–36 and the rear wall 38 are spanned at the top of the tank by a top tank wall having three sections including a small flat rectangular central section 44 of the same width as front wall section 34. Extending outwardly and slightly downwardly from the central 6¼ inch wide and 5½ inch deep top section 44 are a left top wall section 45 and a right top wall section 46. These top wall sections, respectively, interconnect or span the upper edges of frontal wall sections 35 and 36 and corresponding edge portions of the upper edge of rear wall 38.

The opposite left and right ends of the tank 22 are formed by upwardly and inwardly inclined trapezoidal walls 48 and 49. The end walls are 12 inches at the base, 4 inches across the top and about 11.5 inches high. They are inclined inwardly 10 degrees from the vertical. Between the end walls 48 and 49 each front-to-rear vertical cross-section of the tank is trapezoidal with the base of the trapezoid which lies adjacent to the tow vehicle roof being more than twice as long as the top edge of the trapezoid along one of the top wall sections 44, 45 or 46. This not only provides the desired air deflecting frontal area 24 of the tank, but also substantially lowers the center of gravity of the tank to well below half its height when it is filled with water. As the water is drained from the tank the relative height of the center of gravity of the tank and any water contents is progressively lowered.

As depicted in FIG. 1, each of the end walls 48 and 49 is provided with anchoring means such as conventional anchor 50 on each end wall of the tank and a pair of horizontally spaced anchors 51 at each edge of the tow vehicle roof, such as at a rain gutter, with the anchors 50 at each end of the tank being interconnected to the anchors 51 by means of a pair of downwardly and outwardly diverging turnbuckles or tightening straps 52 located as seen in FIG. 1 to securely hold the tank in fixed position against the vehicle roof 22. Instead of being secured only in the material of the end walls 48 and 49, the anchor 50 may be additionally interconnected by a strong metal or plastic strap extending upwardly and across the top of the tank for added anchor holding strength.

Within the tank 22 are two generally trapezoidal shaped baffles 53 and 55 which divide the tank interior into three longitudinal liquid holding chambers. These baffles not only dampen movement of liquid in the tank during highway travel, but they also interconnect and provide structural support to augment the strength of the front, rear, top and bottom tank walls so that the tank is sufficiently strong and rigid that its air-deflecting shape is self-sustained during highway operation of the tow vehicle 10. The baffles are referred to as trapezoidal although their edges are partially cut away to allow liquid flow between chambers during filling and draining of the tank 22.

Figure 5:
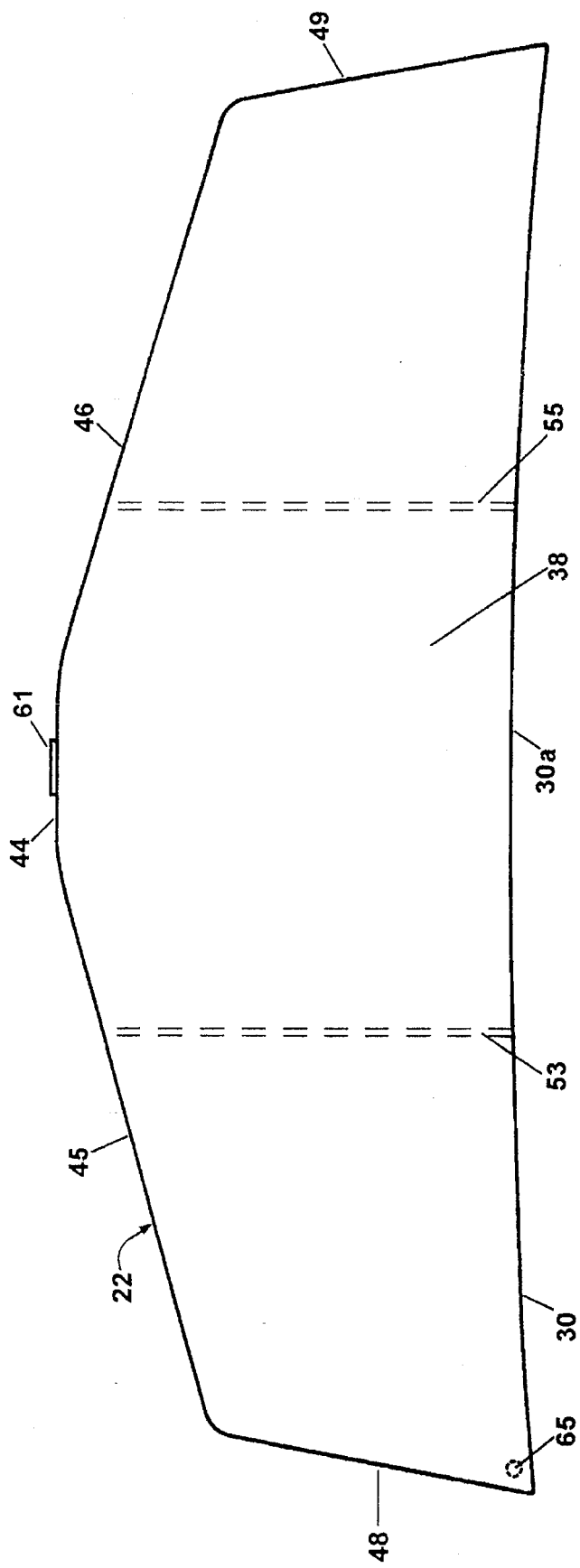
FIG. 5 is a rear view of the tank of FIG. 2 and showing the location of a drain or tap at the lower rear left or street-side end of the tank.

The tank is filled by means of a fill port 61 in the center of the top center wall section 44. This port may be closed by any well-known type of manually operable vented closure or cap, venting providing means to eliminate undesirable changes in pressure within the tank during draining or on changes in altitude during travel. The liquid contents may be drained from the tank for use or disposal by means of any conventional manually operable spigot or tap at the drain port 65 shown in FIG. 5 at the lower left or street-side corner of the rear wall 38.

Although the illustrated tank may be fabricated with wall sections of either metal or plastic sheet material joined together by molding or by fabrication as by welding, laminating or other well-known adhesive processes, a smooth nonporous inert inside wall is preferred for optimum cleaning and sanitizing of the tank as well as facilitating in situ sterilizing or purifying tank contents as with chlorine. Polyethylene is such a suitable inert material and may be formed into an elongated hollow structure like the present tank by the well-known process of roto-molding. The baffles 53 and 55 may be inserted and held in a mold prior to roto-molding the outer shell walls of the tank and the above mentioned cut away edges of the baffles may facilitate flow of molding material past the edges of the baffles during molding which will retain the baffles in place. If the baffles 53 and 55 interfere with such rotational molding of the outer tank wall structure, a small portion of the top wall can be removed for insertion and gluing of baffles of inert material in place using a suitable strong inert adhesive after the tank shell walls are molded. The removed wall portion would then be glued back in place with similar adhesive.

Other variations within the scope of this invention will be apparent from the described embodiment and it is intended that the present descriptions be illustrative of the inventive features encompassed by the appended claims.

What is claimed is:

1. The combination of a liquid storage tank for mounting atop the roof of a trailer tow vehicle, said tow vehicle being connected to a trailer for the purpose of towing said trailer, said trailer having a height equal to or exceeding that of the tow vehicle, the tank comprising a plurality of wall portions rigidly interconnected to form a closed container having a self-sustaining rigid shape, the tank having a bottom wall configured to conform to the external roof surface of the tow vehicle, the tank having a convex front wall configured to reduce drag by deflecting air laterally and/or upwardly relative to the front of said trailer, the tank having a plurality of internal baffles to dampen movement of liquid in the tank during operation of the tow vehicle, the tank having its major length dimension extending across the width of the tow vehicle's roof and having anchoring means at opposite ends of the tank to anchor the tank to opposite sides of the tow vehicle roof, the height and front-to-rear dimensions of the tank being approximately the same with each such dimension being less than half the length of the tank.

2. A tank for mounting atop the roof of a tow vehicle in accordance with claim 1 wherein the tank has an upwardly and rearwardly inclined front wall configured to provide a deflection of air flow laterally and/or upwardly relative to the front of said trailer.

3. A tank for mounting atop roof of said tow vehicle in accordance with claim 1 wherein each front-to-rear vertical planar cross-section of the tank at any point along the length of the tank tapers in linear horizontal dimension as the vertical distance from said bottom wall to the location of said linear horizontal dimension is increased.

4. A tank for mounting atop the roof of a tow vehicle in accordance with claim 1, and having end walls at opposite ends of the length of said tank wherein each front-to-rear cross-section taken in a vertical plane at any point alone the length of the tank and between the tank end walls is trapezoidal.

5. A tank for mounting atop the roof of a tow vehicle in accordance with claim 1 wherein said walls are made of plastic material.

6. A tank for mounting atop the roof of a tow vehicle in accordance with claim 5 wherein said plastic material is polyethylene.

7. A tank for mounting atop the roof of a tow vehicle in accordance with claim 3 wherein said walls are formed by roto-molding.

8. A tank for mounting atop the roof of a tow vehicle in accordance with claim 3 wherein said baffles are made of plastic material.

9. A tank for mounting atop the roof of a tow vehicle in accordance with claim 1 wherein each horizontal planar cross-section of the front wall taken at any point along the height of the front wall is forwardly convex.

10. A tow vehicle having a passenger compartment and a roof over said passenger compartment, a liquid storage tank mounted atop the roof of the tow vehicle, the storage tank comprising a plurality of wall portions rigidly interconnected to form a closed container having a self-sustaining rigid shape, the tank having a bottom wall configured to conform to the upper external roof surface of the tow vehicle, the tank having a convex front wall configured to provide deflection of air flow laterally and upwardly relative to the front of a trailer being towed by the tow vehicle and extending at least as high as the tank above the tow vehicle, the tank having a flat vertically extending rear wall, the tank having a plurality of internal baffles to dampen movement of liquid in the tank during operation of the tow vehicle, the tank having its major length dimension extending transversely of the length of the tow vehicle and having anchoring means at opposite ends of the tank to anchor the tank to opposite sides of the vehicle roof, the height and front-to-rear dimensions of the tank being approximately the same with each such dimension being less than half the length of the tank.

11. A tow vehicle with a tank atop the roof of the tow vehicle in accordance with claim 10 wherein the front wall of the tank is upwardly and rearwardly inclined.

12. A tow vehicle with a tank atop the roof of the tow vehicle in accordance with claim 11, and having end walls at opposite ends of the length of said tank wherein the vertical front-to-rear cross-section of the tank at any point along the length of the tank and between the end walls is trapezoidal.

13. A tow vehicle with a tank atop the roof of the tow vehicle in accordance with claim 11 wherein said walls are made of plastic material.

14. A tow vehicle with a tank atop the roof of the tow vehicle in accordance with claim 13 wherein said plastic material is polyethylene.

15. A tow vehicle with a tank atop the roof of the tow vehicle in accordance with claim 11 wherein said walls are formed by roto-molding.

16. A tow vehicle with a tank atop the roof of the tow vehicle in accordance with claim 13 wherein said baffles are made of plastic material.

17. A tow vehicle having a passenger compartment and a roof over said passenger compartment, a trailer connected to the tow vehicle and having a frontal area extending higher than the roof of the tow vehicle, a liquid storage tank mounted atop the roof of the tow vehicle, the storage tank comprising a plurality of wall portions rigidly interconnected to form a closed container having a self-sustaining rigid shape, the tank having a bottom wall configured to conform to the upper external roof surface of the tow vehicle, the tank having a convex front wall configured to provide a deflection of air flow laterally and upwardly relative to the front of a trailer being towed by the tow vehicle and extending at least as high as the tank above the tow vehicle, the tank having a flat vertically extending rear wall, the tank having a plurality of internal baffles to dampen movement of liquid in the tank during operation of the tow vehicle, the tank having its major length dimension extending transversely of the length of the tow vehicle and having anchoring means at opposite ends of the tank to anchor the tank to opposite sides of the vehicle roof, the height and front-to-rear dimensions of the tank being approximately the same with each such dimension being less than half the length of the tank.

18. The combination of a tow vehicle and trailer according to claim 17 wherein the front wall of the tank is upwardly and rearwardly inclined.

19. The combination of a tow vehicle and trailer according to claim 18 wherein the tow vehicle is a pick-up truck and the trailer is a fifth-wheel trailer connected in the bed of the truck.

20. The combination of a tow vehicle and trailer according to claim 19 wherein the rear wall of the tank is located at the rear of the tow vehicle roof.

* * * * *